US012782537B2

(12) United States Patent
Cheng

(10) Patent No.: US 12,782,537 B2
(45) Date of Patent: Nov. 3, 2026

(54) MICROWAVE SENSOR

(71) Applicant: RichWave Technology Corp., Taipei (TW)

(72) Inventor: Ting-Yuan Cheng, Taipei (TW)

(73) Assignee: RichWave Technology Corp., Taipei (TW)

( * ) Notice: Subject to any disclaimer, the term of this patent is extended or adjusted under 35 U.S.C. 154(b) by 176 days.

(21) Appl. No.: 18/928,203

(22) Filed: Oct. 28, 2024

(65) Prior Publication Data

US 2026/0086218 A1 Mar. 26, 2026

(30) Foreign Application Priority Data

Sep. 20, 2024 (TW) ................................ 113135675

(51) Int. Cl.

| | |
|---|---|
| ***B66B 13/26*** | (2006.01) |
| ***G01S 13/04*** | (2006.01) |
| ***G01S 17/04*** | (2020.01) |
| ***G01S 19/22*** | (2010.01) |
| ***G01S 19/40*** | (2010.01) |
| ***G01S 19/44*** | (2010.01) |

(52) U.S. Cl.
CPC .................................... *G01S 13/04* (2013.01)

(58) Field of Classification Search
CPC ....................................................... G01S 13/04
See application file for complete search history.

(56) References Cited

U.S. PATENT DOCUMENTS

| | | | | |
|---|---|---|---|---|
| 11,385,321 | B2 * | 7/2022 | Lin | G01S 7/0232 |
| 2017/0195508 | A1 | 7/2017 | Park | |
| 2018/0267144 | A1 * | 9/2018 | Lin | G01S 7/4021 |
| 2018/0329050 | A1 * | 11/2018 | Amihood | G01S 13/04 |
| 2020/0125158 | A1 * | 4/2020 | Giusti | G06F 3/012 |

(Continued)

FOREIGN PATENT DOCUMENTS

| | | |
|---|---|---|
| CN | 112241009 | 1/2021 |
| TW | 202304151 | 1/2023 |

(Continued)

OTHER PUBLICATIONS

"Office Action of Taiwan Counterpart Application", issued on Jun. 19, 2025, p. 1-p. 3.

*Primary Examiner* — Nazra Nur Waheed
(74) *Attorney, Agent, or Firm* — JCIPRNET

(57) ABSTRACT

The disclosure provides a microwave sensor including a local frequency circuit, an echo path circuit and a processing circuit. In a power saving mode, the processing circuit disables the local frequency circuit, wherein the echo path circuit transmits a first radar signal to an antenna and receives a first echo signal from the antenna. In response to the processing circuit determining that an object has been detected, the microwave sensor enters a normal mode from the power saving mode. In the normal mode, the processing circuit enables the local frequency circuit, wherein the local frequency circuit transmits a second radar signal to the antenna and output a local frequency signal to the echo path circuit. The echo path circuit receives a second echo signal from the antenna. In response to the processing circuit determining that no object has been detected, the microwave sensor enters the power saving mode from the normal mode.

20 Claims, 9 Drawing Sheets

(56) References Cited

U.S. PATENT DOCUMENTS

| | | | | |
|---|---|---|---|---|
| 2021/0094574 | A1 | 4/2021 | Lee et al. | |
| 2022/0308196 | A1* | 9/2022 | Rao | G01S 13/343 |
| 2024/0248170 | A1* | 7/2024 | Servadei | G01S 7/4013 |

FOREIGN PATENT DOCUMENTS

| | | |
|---|---|---|
| TW | 202425542 | 6/2024 |
| WO | 2024006540 | 1/2024 |

* cited by examiner

MICROWAVE SENSOR

CROSS-REFERENCE TO RELATED APPLICATION

This application claims the priority benefit of Taiwan application serial no. 113135675, filed on Sep. 20, 2024. The entirety of the above-mentioned patent application is hereby incorporated by reference herein and made a part of this specification.

BACKGROUND

Technical Field

The disclosure relates to a microwave circuit, and in particular relates to a microwave sensor that may be configured to detect objects.

Description of Related Art

A microwave sensor transmits radar signals to a detection field through a antenna, and receives corresponding echo signals through the antenna, so as to detect whether an object exists in the detection field. Based on the principle of Doppler Effect, when there are moving objects in the detection field of the microwave sensor, a frequency difference exists between the radar signal emitted by the microwave sensor and the received echo signal, so that the microwave sensor may determine whether an object has been detected. Generally speaking, microwave sensors with higher sensitivity or accuracy tend to consume more power. Conversely, microwave sensors that are more energy-efficient may exhibit lower sensitivity or accuracy. Solutions that may reduce the power consumption of microwave sensors while maintain good sensitivity or accuracy may be desired in the field of radar sensing technology.

SUMMARY

A microwave sensor for detecting objects in a field is provided in the disclosure.

In an embodiment of the disclosure, the microwave sensor includes a local frequency circuit, an echo path circuit, and a processing circuit. The echo path circuit is coupled to an antenna module. The processing circuit is coupled to the local frequency circuit and the echo path circuit. When the microwave sensor operates in the power saving mode, the processing circuit disables the local frequency circuit. The echo path circuit may transmit a first radar signal, receive a first echo signal related to the first radar signal from the antenna module, and output a first identification signal to the processing circuit based on the first echo signal. The processing circuit may determine whether the object has been detected based on the first identification signal. In response to the processing circuit determining that the object has been detected, the microwave sensor may enter a normal mode from the power saving mode. When the microwave sensor operates in the normal mode, the processing circuit enables the local frequency circuit. The local frequency circuit may transmit a second radar signal and output the local frequency signal to the echo path circuit. The echo path circuit may receive a second echo signal related to the second radar signal from the antenna module, and output a second identification signal to the processing circuit based on the second echo signal and based on the local frequency signal. The processing circuit may determine whether the object has been detected based on the second identification signal. In response to the processing circuit determining that no object has been detected, the microwave sensor may enter the power saving mode from the normal mode.

In an embodiment of the disclosure, the microwave sensor includes a local frequency circuit, an echo path circuit, and a processing circuit. The local frequency circuit includes a voltage controlled oscillator and a phase-locked loop coupled to the voltage controlled oscillator. The echo path circuit is coupled to an antenna module. The processing circuit is coupled to the local frequency circuit and the echo path circuit. When the microwave sensor operates in a power saving mode, the processing circuit disables the phase-locked loop. The local frequency circuit may transmit the first radar signal to the antenna module. The echo path circuit may receive a first echo signal related to the first radar signal from the antenna module, and output a first identification signal to the processing circuit based on the first echo signal. The processing circuit may determine whether the object has been detected based on the first identification signal. In response to the processing circuit determining that the object has been detected, the microwave sensor may enter a normal mode from the power saving mode. When the microwave sensor operates in a normal mode, the processing circuit enables the phase-locked loop. The local frequency circuit may transmit a second radar signal and output the local frequency signal to the echo path circuit. The echo path circuit may receive a second echo signal related to the second radar signal from the antenna module, and output a second identification signal to the processing circuit based on the second echo signal and the local frequency signal. The processing circuit may determine whether the object has been detected based on the second identification signal. In response to the processing circuit determining that no object has been detected, the microwave sensor may enter the power saving mode from the normal mode.

Based on the above, a microwave sensor according to at least one embodiment of the disclosure may detect whether there is an object in the field. When the microwave sensor in the power saving mode determines that an object has been detected, it may enter the normal mode to enable the local frequency circuit, so as to improve the sensitivity or accuracy of the microwave sensor. When the microwave sensor in the normal mode determines that no object has been detected, it may return to the power saving mode to disable the local frequency circuit, thereby reducing the power consumption of the microwave sensor.

In order to make the above-mentioned features and advantages of the disclosure comprehensible, embodiments accompanied with drawings are described in detail below.

DETAILED DESCRIPTION OF DISCLOSED EMBODIMENTS

Figure 1:
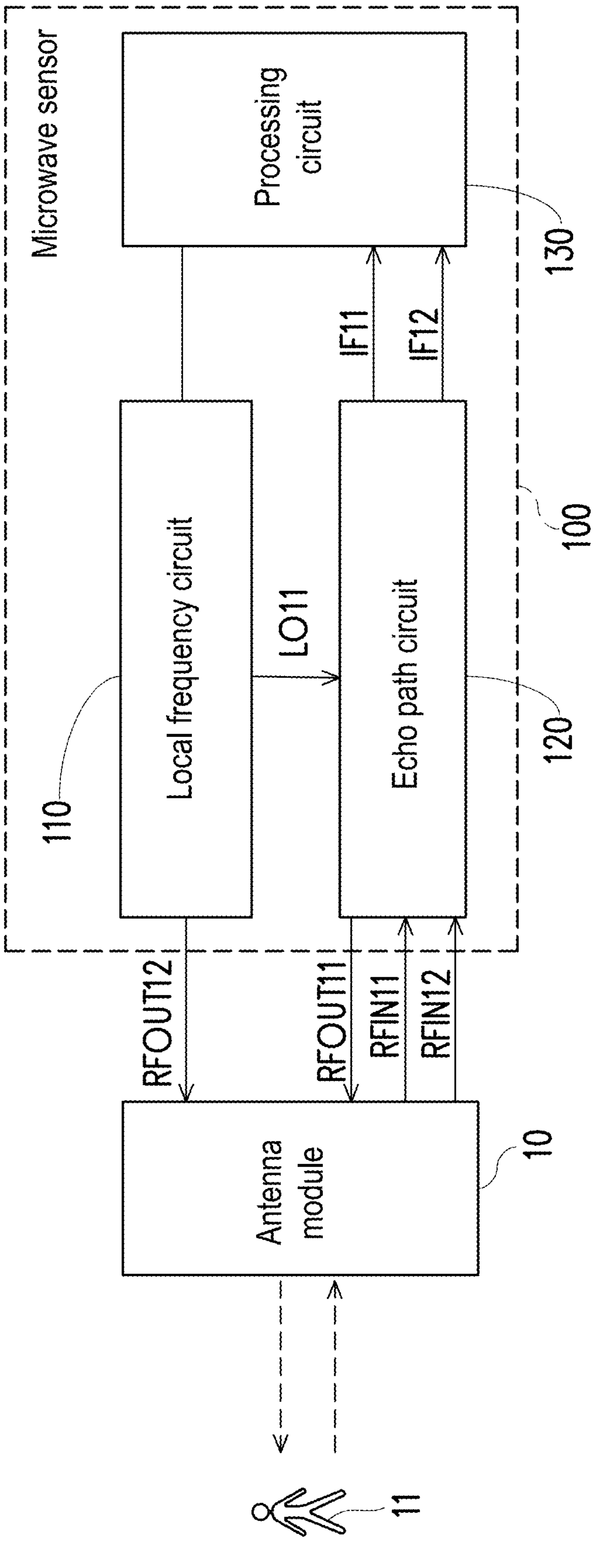
FIG. 1 is a circuit block schematic diagram of a microwave sensor according to an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device may be directly connected to the second device, or the first device may be indirectly connected to the second device through another device or some type of connecting means. Terms "first," "second" and the like mentioned in the full text (including the scope of the patent application) of the description of this application are used only to name the elements or to distinguish different embodiments or scopes, and may not be intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

FIG. 1 is a circuit block schematic diagram of a microwave sensor 100 according to an embodiment of the disclosure. In the application scenario shown in FIG. 1, the microwave sensor 100 may detect whether there is an object 11 in the field. The object 11 may be, for example, a human being. In the embodiment shown in FIG. 1, the microwave sensor 100 includes a local frequency circuit 110, an echo path circuit 120, and a processing circuit 130. The local frequency circuit 110 and the echo path circuit 120 may be coupled to the antenna module 10. The specific implementation of the antenna module 10 is not limited in this embodiment. For example, the antenna module 10 may include a conventional transmitting antenna, a receiving antenna, or a combination thereof.

The processing circuit 130 may be coupled to the local frequency circuit 110 and the echo path circuit 120. The processing circuit 130 is configured to control at least one component of the microwave sensor 100, such as the local frequency circuit 110 and/or the echo path circuit 120. Depending on the design, in some embodiments, the implementation of the processing circuit 130 may include hardware, software, and/or firmware, or a combination thereof. In terms of hardware, the processing circuit 130 may be a logic circuit implemented in an integrated circuit form. For example, the processing circuit 130 may be implemented as one or more controllers, a microcontroller, a microprocessor, an application-specific integrated circuit (ASIC), a digital signal processor (DSP), a field programmable gate array (FPGA), a central processing unit (CPU), and/or various logic blocks, modules, and circuits in other processing units. Some programs for controlling the processing circuit 130 or some programs executed by the processing circuit 130 may be written using hardware description languages (e.g., Verilog HDL or VHDL) or other suitable programming languages. In terms of software and/or firmware, related functions of the processing circuit 130 may be implemented as programming codes. For example, the processing circuit 130 may be implemented using general programming languages (e.g., C, C++, or assembly language) or other suitable programming languages. The programming code may be recorded/stored in a "non-transitory machine-readable storage medium". In some embodiments, the non-transitory machine-readable storage medium includes, for example, a semiconductor memory and/or a storage device. An electronic device (e.g., a computer, a CPU, a controller, a microcontroller, or a microprocessor) may read and execute the programming code from the non-transitory machine-readable storage medium, thereby achieving related functions of the processing circuit 130.

In some embodiments, the microwave sensor 100 may operate in a power saving mode. In this case, the local frequency circuit 110 may be disabled, for example, under the control of the processing circuit 130, so as to reduce power consumption, such as current consumption, of the microwave sensor 100. The echo path circuit 120 may be enabled, and may transmit the radar signal RFOUT11 to the antenna module 10, receive the echo signal RFIN11 from the antenna module 10, and output the identification signal IF11 based on the echo signal RFIN11. The identification signal IF11 is then transmitted to the processing circuit 130. The processing circuit 130 may determine whether any object (e.g., object 11) has been detected based on the identification signal IF11.

In this embodiment, the echo signal RFIN11 may be related to the radar signal RFOUT11. For example, the radar signal RFOUT11 may be a microwave signal with a first frequency, which is transmitted to the object 11 and is reflected to form the echo signal RFIN11. The echo signal RFIN11 may be determined based on the Doppler Effect, which may be related to the movement, speed of the object 11, and/or the distance from the microwave sensor 100, etc. In further embodiments, the radar signal RFOUT11 may not be limited to a single frequency signal, and may, for example, include a plurality of microwave signals with a plurality of frequencies.

It should be noted that a "disabled" state does not mean a "not working at all" state, but a state where a function or an operation may be weakened as compared to an "enabled" state. In the above embodiment, the local frequency circuit 110 which is controlled by the processing circuit 130 and is in a disabled state may not transmit a radar signal.

In a power saving mode, the local frequency circuit 110 is disabled and the microwave sensor 100 may save power. However, its sensitivity or accuracy of detecting the object 11 in the field may be low, and may be more susceptible to interference from the external environment. In order to further achieve better sensitivity and/or accuracy, if the processing circuit 130 determines that an object 11 has been detected in the power saving mode, the microwave sensor 100 may enter a normal mode from the power saving mode to further determine the existence of the object 11.

In some embodiments, the microwave sensor 100 may operate in a normal mode. In this case, the local frequency circuit 110 is enabled, so as to improve the sensitivity or accuracy of the microwave sensor 100. The local frequency circuit 110 may transmit a radar signal RFOUT12 to the antenna module 10, and output a local frequency signal LO11 to the echo path circuit 120. The echo path circuit 120 may be enabled to receive an echo signal RFIN12 related to the radar signal RFOUT12 from the antenna module 10. The echo path circuit 120 may further output an identification signal IF12 based on the echo signal RFIN12 and based on the local frequency signal LO11. The identification signal IF12 is then transmitted to the processing circuit 130. The processing circuit 130 may determine whether an object 11 has been detected based on the identification signal IF12.

Similarly, in this embodiment, the echo signal RFIN12 may be related to the radar signal RFOUT12. For example, the radar signal RFOUT12 may be a microwave signal with a second frequency, which is transmitted to the object 11 and is reflected to form the echo signal RFIN12. The echo signal RFIN12 may be determined based on the Doppler Effect, which may be related to the movement, the speed of the object 11, and/or distance from the microwave sensor 100, etc. In further embodiments, the radar signal RFOUT12 may not be limited to a single frequency signal, and may, for example, include a plurality of microwave signals with a plurality of frequencies.

In the normal mode, the local frequency circuit 110 and the echo path circuit 120 controlled by the processing circuit 130 are both enabled, and the radar signal RFOUT12 is transmitted by the local frequency circuit 110 instead of the echo path circuit 120 as in the power saving mode. The microwave sensor 100 has better sensitivity and/or higher accuracy, and is less susceptible to interference from the external environment. Furthermore, if the processing circuit 130 determines that no object has been detected in the normal mode, the microwave sensor 100 may enter the power saving mode from the normal mode.

Figure 2:
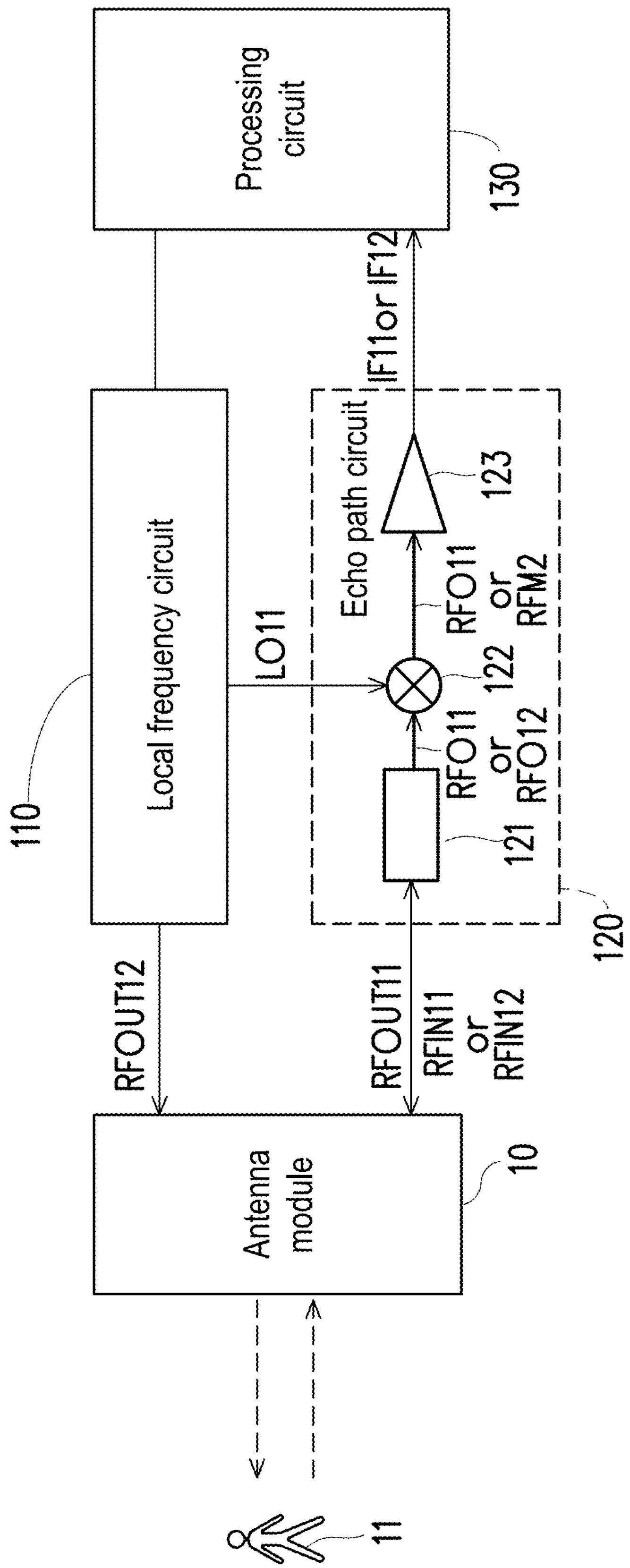
FIG. 2 is a circuit block diagram of a microwave sensor according to an embodiment of the disclosure, which shows the echo path circuit in more detail.

FIG. 2 is a circuit block diagram of a microwave sensor according to an embodiment of the disclosure, which shows the echo path circuit 120 in more detail. The echo path circuit 120 shown in FIG. 2 may be configured as one of many embodiments of the echo path circuit 120 shown in FIG. 1. For the object 11, the antenna module 10, the local frequency circuit 110, and the processing circuit 130 shown in FIG. 2, references may be made to the relevant descriptions of FIG. 1, so details may not be repeated herein. In the embodiment shown in FIG. 2, the echo path circuit 120 may include an oscillation amplifying circuit 121, a frequency-mixing switching circuit 122, and an amplifier 123. The oscillation amplifying circuit 121 may include a first port coupled to the antenna module 10 and a second port coupled to the frequency-mixing switching circuit 122. The frequency-mixing switching circuit 122 may include a first input port, a second input port and an output port. The first input port may be coupled to the oscillation amplifying circuit 121, and for example, coupled to the second port of the oscillation amplifying circuit 121. The second input port of the frequency-mixing switching circuit 122 may be coupled to the local frequency circuit 110, and the output port may be coupled to the amplifier 123. The amplifier 123 may include an input port coupled to the frequency-mixing switching circuit 122 and an output port coupled to the processing circuit 130.

As described above, in the power saving mode, the echo path circuit 120 may be enabled. The oscillation amplifying circuit 121 may transmit the radar signal RFOUT11 through the first port to the antenna module 10, and receive the echo signal RFIN11 from the antenna module 10. The oscillation amplifying circuit 121 amplifies the echo signal RFIN11, and outputs the amplified signal RFO11 through the second port. The frequency-mixing switching circuit 122 may receive the amplified signal RFO11 from the oscillation amplifying circuit 121 through its first input port (e.g., the amplified signal RFO11 may correspond to the echo signal RFIN11), and output the amplified signal RFO11 to the amplifier 123 through its output port. The amplifier 123 may receive the amplified signal RFO11 through its input port, and may provide the identification signal IF11 to the processing circuit 130 via its output port. That is, the identification signal IF11 may correspond to the amplified signal RFO11, which in turn may correspond to the echo signal RFIN11.

As described above, in the normal mode, the echo path circuit 120 may also be enabled. The oscillation amplifying circuit 121 may not transmit a radar signal, but may receive the echo signal RFIN12 from the antenna module 10 through its first port. The oscillation amplifying circuit 121 amplifies the echo signal RFIN12, and outputs the amplified signal RFO12 through its second port. The frequency-mixing switching circuit 122 may receive through its first input port the amplified signal RFO12 from the oscillation amplifying circuit 121 (e.g., the amplified signal RFO12 may correspond to the echo signal RFIN12), and receive through its second input port the local frequency signal LO11 from the local frequency circuit 110. The frequency-mixing switching circuit 122 may mix the amplified signal RFO12 and the local frequency signal LO11, thereby providing a frequency-mixing signal RFM2 to the amplifier 123. The amplifier 123 may receive the frequency-mixing signal RFM2 and may provide the identification signal IF12 to the processing circuit 130. That is, the identification signal IF12 may correspond to the frequency-mixing signal RFM2, thereby being related to a mixed signal of the amplified signal RFO12 and the local frequency signal LO11.

In some embodiments, amplifier 123 includes a programmable gain amplifier (PGA). Circuit details of the oscillation amplifying circuit 121 and the frequency-mixing switching circuit 122 may be described in further detail below.

Figure 3:
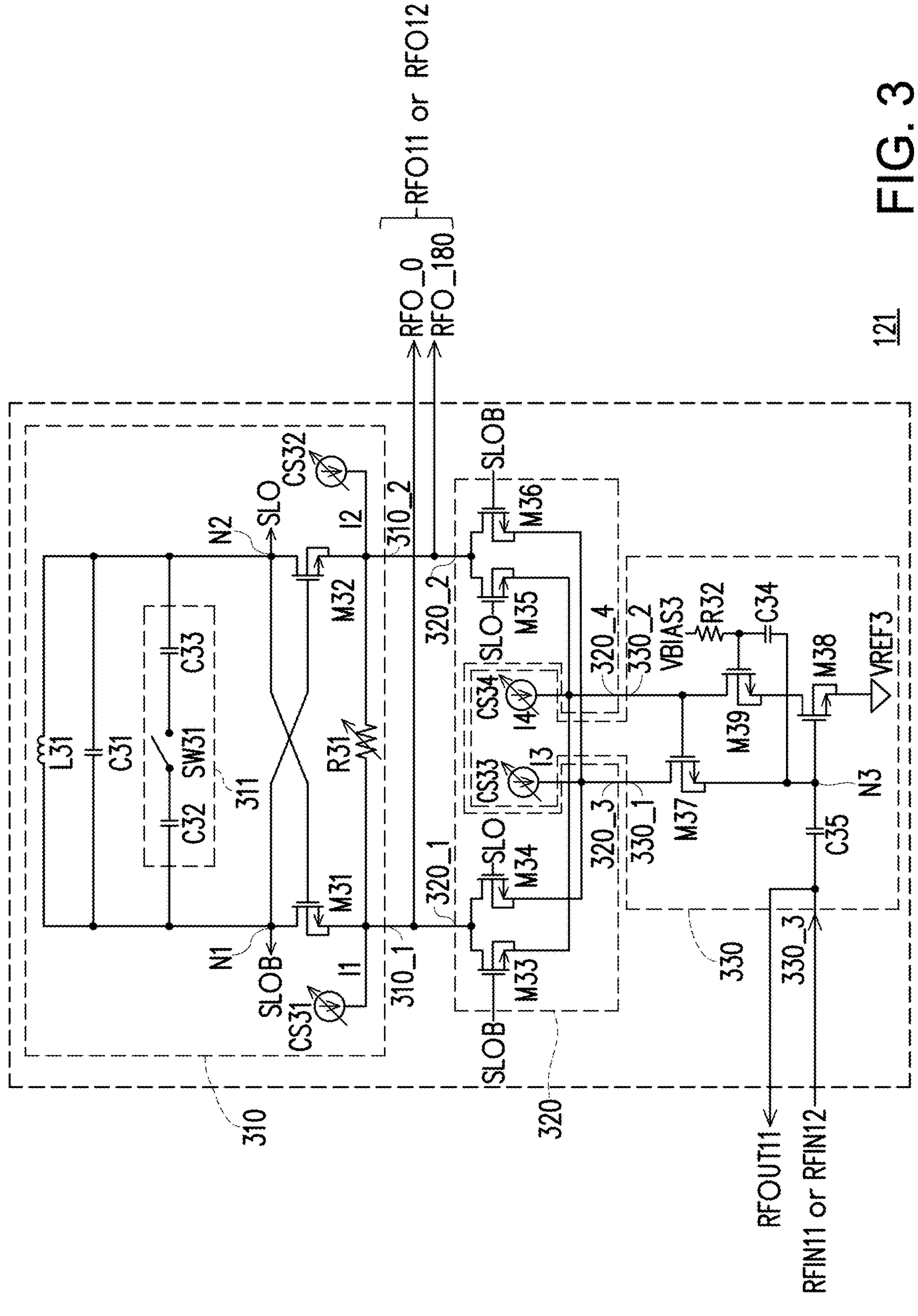
FIG. 3 is a circuit block diagram of an oscillation amplifying circuit of an echo path circuit according to an embodiment of the disclosure.

FIG. 3 is a circuit block diagram of an oscillation amplifying circuit 121 of an echo path circuit according to an embodiment of the disclosure. The oscillation amplifying circuit 121 shown in FIG. 3 may be configured as one of many embodiments of the oscillation amplifying circuit 121 shown in FIG. 2. In the embodiment shown in FIG. 3, the oscillation amplifying circuit 121 includes an oscillation circuit 310, a switching circuit 320, and an amplifying circuit 330. The switching circuit 320 may be coupled between the oscillation circuit 310 and the amplifying circuit 330.

Specifically, in the oscillation amplifying circuit 121, the oscillation circuit 310 may include a first terminal 310_1 and a second terminal 310_2, which may both be coupled to the second port of the oscillation amplifying circuit 121 to respectively provide amplified signals RFO_0 and RFO_180 (e.g., collectively referred as the amplified signal RFO11). The switching circuit 320 may include a first terminal 320_1, a second terminal 320_2, a third terminal 320_3, and a fourth terminal 320_4. The first terminal 320_1 and the second terminal 320_2 may be respectively coupled to the first terminal 310_1 and the second terminal 310_2 of the oscillation circuit 310. The amplifying circuit 330 may include a first terminal 330_1, a second terminal 330_2, and a third terminal 330_3. The first terminal 330_1 and the second terminal 330_2 of the amplifying circuit 330 may be respectively coupled to the third terminal 320_3 and the fourth terminal 320_4 of the switching circuit 320. The third terminal 330_3 of the amplifying circuit 330 may be coupled to the first port of the oscillation amplifying circuit 121 to transmit the radar signal RFOUT11 to the antenna module 10, or to receive the echo signal RFIN11 or RFIN12 from the antenna module 10.

In the embodiment shown in FIG. 3, the oscillation circuit 310 may include an inductor L31, a capacitor C31, a frequency band adjustment circuit 311, a transistor M31, a transistor M32, a current source CS31, a current source CS32, and a resistor R31. As shown, in the oscillation circuit 310, the node N1 and the node N2 may be respectively configured to provide local oscillation signals SLOB and SLO to the switching circuit 320.

The first terminal (e.g., the drain) of the transistor M31 is coupled to the node N1, the second terminal (e.g., the source) is coupled to the first terminal 310_1 of the oscillation circuit 310, and the control terminal (e.g., the gate) is coupled to the node N2. The first terminal (e.g., the drain) of the transistor M32 is coupled to the node N2, the second terminal (e.g., the source) is coupled to the second terminal 310_2 of the oscillation circuit 310, and the control terminal (e.g., the gate) is coupled to the node N1. The first terminal of the inductor L31 and the first terminal of the capacitor C31 may be coupled to the node N1. The second terminal of the inductor L31 and the second terminal of the capacitor C31 may be coupled to the node N2. The first terminal of the frequency band adjustment circuit 311 may be coupled to the node N1, and its second terminal may be coupled to the node N2. The first terminal and the second terminal of the resistor R31 may be respectively coupled to the second terminal of the transistor M31 and the second terminal of the transistor M32. For example, the resistor R31 includes a variable resistor.

As shown, the frequency band adjustment circuit 311 may include a capacitor C32, a capacitor C33 and a switching element SW31 coupled in series. The capacitor C32 may be coupled to the node N1, the capacitor C33 may be coupled to the node N2, and the switching element SW31 may be coupled between the capacitors C32 and C33. For example, the first terminal and the second terminal of the switching element SW31 may be respectively coupled to the second terminal of the capacitor C32 and the first terminal of the capacitor C33.

The current output terminal of the current source CS31 may be coupled to the second terminal of the transistor M31 to provide a current I1. The current output terminal of the current source CS32 may be coupled to the second terminal of the transistor M32 to provide a current I2. For example, current source CS31 and current source CS32 may include controllable current sources. In some embodiments, the magnitudes of the currents I1 and I2 may be determined depending on an actual design and application, which will be further described below.

In the embodiment shown in FIG. 3, the switching circuit 320 may include a transistor M33, a transistor M34, a transistor M35, and a transistor M36. The first terminal (e.g., the drain) of the transistor M33 and the first terminal (e.g., the drain) of the transistor M34 may be coupled to the first terminal 320_1 of the switching circuit 320. The first terminal (e.g., the drain) of the transistor M35 and the first terminal (e.g., the drain) of the transistor M36 may be coupled to the second terminal 320_2 of the switching circuit 320. The second terminal (e.g., the source) of the transistor M34 and the second terminal (e.g., the source) of the transistor M36 may be coupled to the third terminal 320_3 of the switching circuit 320. The second terminal (e.g., the source) of the transistor M33 and the second terminal (e.g., the source) of the transistor M35 may be coupled to the fourth terminal 320_4 of the switching circuit 320. The control terminal (e.g., the gate) of the transistor M33 and the control terminal (e.g., the gate) of the transistor M36 may be coupled to the node N1 to receive the local oscillation signal SLOB. The control terminal (e.g., the gate) of the transistor M34 and the control terminal (e.g., the gate) of the transistor M35 may be coupled to the node N2 to receive the local oscillation signal SLO.

In the embodiment shown in FIG. 3, the amplifying circuit 330 includes a transistor M37, a transistor M38, a transistor M39, a current source CS33, a current source CS34, a resistor R32, a capacitor C34, and a capacitor C35. As shown, in the amplifying circuit 330, the node N3 may be coupled to the third terminal 330_3 to transmit the radar signal RFOUT11, or to receive the echo signal RFIN11 or RFIN12.

The first terminal (e.g., the drain) of the transistor M37 may be coupled to the first terminal 330_1 of the amplifying circuit 330, and the second terminal (e.g., the source) may be coupled to the node N3. The control terminal (e.g., the gate) of the transistor M38 is coupled to the node N3, and the second terminal (e.g., the source) is coupled to the reference voltage terminal VREF3. The first terminal of the transistor M39 is coupled to the second terminal 330_2 of the amplifying circuit 330, and the second terminal (e.g., the source) is coupled to the first terminal (e.g., the drain) of the transistor M38. The control terminal (e.g., the gate) of the transistor M37 may be coupled to the first terminal of the transistor M39 and further coupled to the second terminal 330_2 of the amplifying circuit 330. The control terminal (e.g., the gate) of the transistor M39 is coupled to the bias voltage terminal VBIAS3. For example, the voltage of the reference voltage terminal VREF3 may be a ground voltage or other fixed voltage. The voltage of the bias voltage terminal VBIAS3 may be a variable voltage or other fixed voltage.

The current output terminal of the current source CS33 may be coupled to the first terminal (e.g., the drain) of the transistor M37 to provide a third current I3. The current output terminal of the current source CS34 may be coupled to the first terminal (e.g., the drain) of the transistor M39 to provide a fourth current I4. In some embodiments, the magnitudes of the currents I3 and I4 may be determined depending on an actual design and application, which will be further described below. Furthermore, the current output terminal of the current source CS33 may also be coupled to the second terminal of the transistor M34 and the second terminal of the transistor M36 in the switching circuit 320. The current output terminal of the current source CS34 may also be coupled to the second terminal of the transistor M33 and the second terminal of the transistor M35 in the switching circuit 320.

The first terminal of the resistor R32 is coupled to the bias voltage terminal VBIAS3, and the second terminal is coupled to the control terminal of the transistor M39. That is, the resistor R32 may be coupled between the bias voltage terminal VBIAS3 and the control terminal of the transistor M39. The first terminal of the capacitor C34 is coupled to the control terminal of the transistor M39, and the second terminal is coupled to the node N3. That is, the capacitor C34 may be coupled between the control terminal of the transistor M39 and the node N3. The first terminal of the capacitor C35 is coupled to the third terminal 330_3 of the amplifying circuit 330, and the second terminal is coupled to the node N3. That is, the capacitor C35 may be coupled between the third terminal 330_3 of the amplifying circuit 330 and the node N3.

As described above, in the power saving mode, the oscillation amplifying circuit 121 of the echo path circuit 120 may be enabled. Specifically, the oscillation circuit 310 in the oscillation amplifying circuit 121 may be enabled. The current source CS31 may provide a smaller current I1, and the current source CS32 may also provide a smaller current I2. For example, the currents I1 and I2 may both be equal to zero. In this case, the transistor of the oscillation circuit 310 may have a large negative impedance. The oscillation circuit 310 may provide the local oscillation signal SLOB at the node N1 and the local oscillation signal SLO at the node N2. The oscillation circuit 310 oscillates at a specific frequency, thereby transmitting the radar signal RFOUT11 through the switching circuit 320 and the amplifying circuit 330. Furthermore, the amplifying circuit 330 in the oscillation amplifying circuit 121 may be enabled. The current I3 provided by the current source CS33 may be greater than the current I4 provided by the current source CS34, and both are greater than zero. The amplifying circuit 330 may amplify the echo signal RFIN11 to generate an amplified signal RFO11, which is then provided to the frequency-mixing switching circuit 122. Therefore, the oscillation amplifying circuit 121 may substantially function as an oscillator.

As described above, in the normal mode, the oscillation amplifying circuit 121 of the echo path circuit 120 may also be enabled. Specifically, in the oscillation amplifying circuit 121, the current source CS31 may provide a larger current I1, and the current source CS32 may also provide a larger current I2. For example, the current I1 may be equal to the current I2 and both are greater than zero. In this case, the transistor of the oscillation circuit 310 may have a small negative impedance, so that the local oscillation signals SLO and SLOB are fixed at a certain bias voltage level. Furthermore, the amplifying circuit 330 in the oscillation amplifying circuit 121 may be enabled. The current I3 may be less than or equal to the current I4, and both are greater than zero. The amplifying circuit 330 may amplify the echo signal RFIN12 to generate an amplified signal RFO12, which is then provided to the frequency-mixing switching circuit 122. Therefore, the oscillation amplifying circuit 121 may substantially function as a low-noise amplifier (LNA). In some embodiments, in the normal mode, the echo path circuit 120 may not transmit a radar signal RFOUT11.

Figure 4:
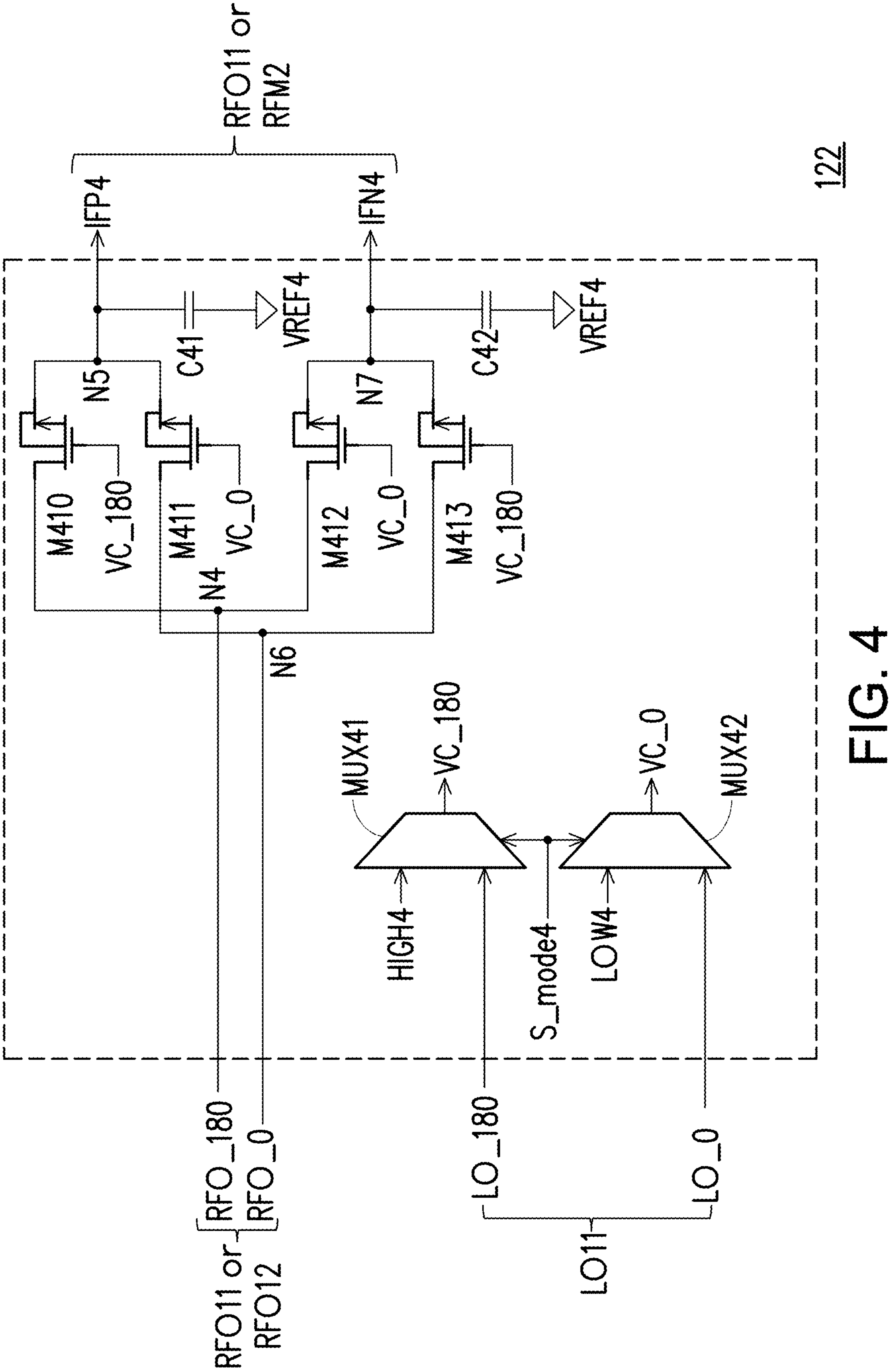
FIG. 4 is a circuit block diagram of a frequency-mixing switching circuit of an echo path circuit according to an embodiment of the disclosure.

FIG. 4 is a circuit block diagram of a frequency-mixing switching circuit 122 of an echo path circuit according to an embodiment of the disclosure. The frequency-mixing switching circuit 122 shown in FIG. 4 may be configured as one of many embodiments of the frequency-mixing switching circuit 122 shown in FIG. 2. In the embodiment shown in FIG. 4, the frequency-mixing switching circuit 122 includes a transistor M410, a transistor M411, a transistor M412, a transistor M413, a capacitor C41, a capacitor C42, a selector MUX41, and a selector MUX42. As shown in FIG. 4 and FIG. 2, in the frequency-mixing switching circuit 122, the nodes N4 and N6 may be coupled to the first input port of the frequency-mixing switching circuit 122 and thereby further coupled to the second port of the oscillation amplifying circuit 121, to receive the amplified signals RFO_0 and RFO_180 from the oscillation amplifying circuit 121. The nodes N5 and N7 may be coupled to the output port of the frequency-mixing switching circuit 122 and thereby further coupled to the input port of the amplifier 123, to provide the amplified signal RFO11 or the frequency-mixing signal RFM2.

In detail, in the frequency-mixing switching circuit 122, the first terminal (e.g., the drain) of the transistor M410 and the first terminal (e.g., the drain) of the transistor M412 may be coupled to the node N4. The first terminal (e.g., the drain) of the transistor M411 and the first terminal (e.g., the drain) of the transistor M413 may be coupled to the node N6. The second terminal (e.g., the source) of the transistor M410 and the second terminal (e.g., the source) of the transistor M411 may be coupled to the node N5. The second terminal (e.g., the source) of the transistor M412 and the second terminal (e.g., the source) of the transistor M413 may be coupled to the node N7.

As described above, the frequency-mixing switching circuit 122 may receive through its second input port the local frequency signal LO11 from the local frequency circuit 110. The local frequency signal LO11 includes a frequency-phase signal LO_180 and a frequency-phase signal LO_0.

In the embodiment shown in FIG. 4, a first selection terminal of the selector MUX41 may receive a fixed voltage signal HIGH4. A second selection terminal of the selector MUX41 is coupled to the second input port of the frequency-mixing switching circuit 122, thereby receiving the frequency-phase signal LO_180. An output terminal of the selector MUX41 may be coupled to the control terminals (e.g., the gates) of the transistors M410 and M413 to provide the phase control signal VC_180. Under the control of a selection signal S_mode4, the selector MUX41 may select the fixed voltage signal HIGH4 or the frequency-phase signal LO_180 as the phase control signal VC_180.

In the embodiment shown in FIG. 4, a first selection terminal of the selector MUX42 may receive a fixed voltage signal LOW4. A second selection terminal of the selector MUX42 is coupled to the second input port of the frequency-mixing switching circuit 122, thereby receiving the frequency-phase signal LO_0. An output terminal of the selector MUX42 may be coupled to the control terminals (e.g., the gates) of the transistors M411 and M412 to provide the phase control signal VC_0. Under the control of a selection signal S_mode4, the selector MUX42 may select the fixed voltage signal LOW4 or the frequency-phase signal LO_0 as the phase control signal VC_0. In some embodiments, the actual levels of the fixed voltage signals HIGH4 and LOW4 may be determined depending on an actual design and application.

The first terminal of the capacitor C41 is coupled to the node N5, and the second terminal is coupled to the reference voltage terminal VREF4. The first terminal of the capacitor C42 is coupled to the node N7, and the second terminal is coupled to the reference voltage terminal VREF4. Based on an actual design, the voltage of the reference voltage terminal VREF4 may be a ground voltage or other fixed voltage.

As described above, in the power saving mode, the frequency-mixing switching circuit 122 may receive the amplified signal RFO11 (e.g., including the amplified signals RFO_0 and RFO_180) from the oscillation amplifying circuit 121, and output the amplified signal RFO11. For example, the selector MUX41 may select the fixed voltage signal HIGH4 as the phase control signal VC_180, and the selector MUX42 may select the fixed voltage signal LOW4 as the phase control signal VC_0. The fixed voltage signal HIGH4 may turn on the transistors M410 and M413, and the fixed voltage signal LOW4 may turn off the transistors M411 and M412.

As described above, in the normal mode, both the local frequency circuit 110 and the echo path circuit 120 are enabled. The frequency-mixing switching circuit 122 may receive the amplified signal RFO12 (e.g., including the amplified signals RFO_0 and RFO_180) from the oscillation amplifying circuit 121, and receive the local frequency signal LO11 (e.g., including frequency-phase signals LO_180 and LO_0) from the local frequency circuit 110. The frequency-mixing switching circuit 122 may mix the amplified signal RFO12 and the local frequency signal LO11, thereby providing a frequency-mixing signal RFM2 (e.g., including the signals IFP4 and IFN4). For example, the selector MUX41 may select the frequency-phase signal LO_180 as the phase control signal VC_180, and the selector MUX42 may select the frequency-phase signal LO_0 as the phase control signal VC_0. In some embodiments, the frequency-phase signal LO_180 may be an inverted signal of the frequency-phase signal LO_0. As for the transistors M410 and M413, the frequency-phase signal LO_180 received by the control terminals may frequently turn on and off the transistors M410 and M413. As for the transistors M411 and M412, the frequency-phase signal LO_0 received by the control terminals may frequently turn off and on the transistors M411 and M412. Therefore, in the normal mode, the frequency-mixing switching circuit 122 may mix the amplified signal RFO12 and the local frequency signal LO11, so as to output the frequency-mixing signal RFM2 to the amplifier 123.

Figure 5:
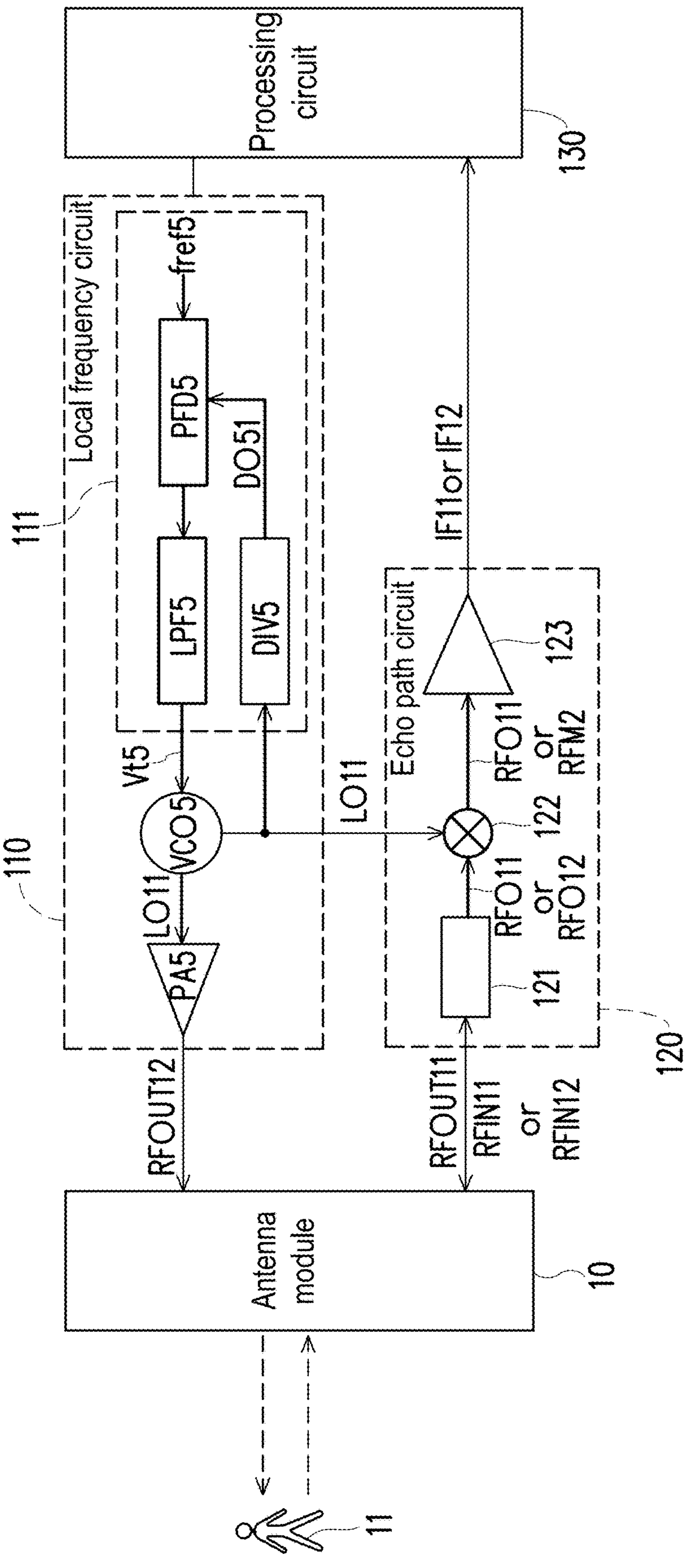
FIG. 5 is a circuit block diagram of a microwave sensor according to an embodiment of the disclosure, which further shows the local frequency circuit in more detail.

FIG. 5 is a circuit block diagram of a microwave sensor according to an embodiment of the disclosure, which further shows the local frequency circuit 110 in more detail. The local frequency circuit 110 shown in FIG. 5 may be configured as one of many embodiments of the local frequency circuit 110 shown in FIG. 1. For the object 11, the antenna module 10, the echo path circuit 120, and the processing circuit 130 shown in FIG. 5, references may be made to the relevant descriptions of FIG. 1 or FIG. 2, so details may not be repeated herein. In the embodiment shown in FIG. 5, the local frequency circuit 110 may include a phase-locked loop (PLL) 111, a voltage controlled oscillator (VCO) VCO5 and a power amplifier (PA) PA5. The voltage controlled oscillator VCO5 is coupled to the phase-locked loop 111 and to the frequency-mixing switching circuit 122 of the echo path circuit 120. The input terminal of the power amplifier PA5 is coupled to the voltage controlled oscillator VCO5 to receive the local frequency signal LO11.

In the embodiment shown in FIG. 5, the phase-locked loop 111 may include a phase frequency detector (PFD) PFD5, a low-pass filter (LPF) LPF5, and a frequency divider DIV5. As shown, the phase frequency detector PFD5 may receive the reference frequency fref5 and the frequency division signal DO51 from the frequency divider DIV5. The phase frequency detector PFD5 may compare the frequency division signal DO51 with the reference frequency fref5, so as to output the comparison result. The input terminal of the low-pass filter LPF5 may be coupled to the output terminal of the phase frequency detector PFD5 to receive the comparison result. The output terminal of the low-pass filter LPF5 may be coupled to the voltage controlled oscillator VCO5 to provide the adjustment voltage Vt5 to the control port of the voltage controlled oscillator VCO5. Under the control of the adjustment voltage Vt5, the voltage controlled oscillator VCO5 may adjust the frequency of the local frequency signal LO11. The input terminal of the frequency divider DIV5 may be coupled to the voltage controlled oscillator VCO5 to receive the local frequency signal LO11. The frequency divider DIV5 performs frequency division on the local frequency signal LO11 to generate the frequency division signal DO51.

As described above, in the power saving mode, the local frequency circuit 110 may be disabled. For example, the processing circuit 130 may disable the phase-locked loop 111, the voltage controlled oscillator VCO5 and/or the power amplifier PA5 of the local frequency circuit 110. For example, the processing circuit 130 may disable the phase-locked loop 111, and in this case, the processing circuit 130 may disable at least one of the followings: the low-pass filter LPF5, the phase frequency detector PFD5, and the frequency divider DIV5.

As described above, in the normal mode, the local frequency circuit 110 may be enabled. For example, the processing circuit 130 may enable the phase-locked loop 111, the voltage controlled oscillator VCO5 and the power amplifier PA5 of the local frequency circuit 110, so that the voltage controlled oscillator VCO5 may provide the local frequency signal LO11 to the power amplifier PA5 and to the frequency-mixing switching circuit 122. The power amplifier PA5 may amplify the local frequency signal LO11, so as to output the radar signal RFOUT12 to the antenna module 10. For example, the processing circuit 130 may enable the low-pass filter LPF5, the phase frequency detector PFD5 and the frequency divider DIV5 in the phase-locked loop 111.

Figure 6:
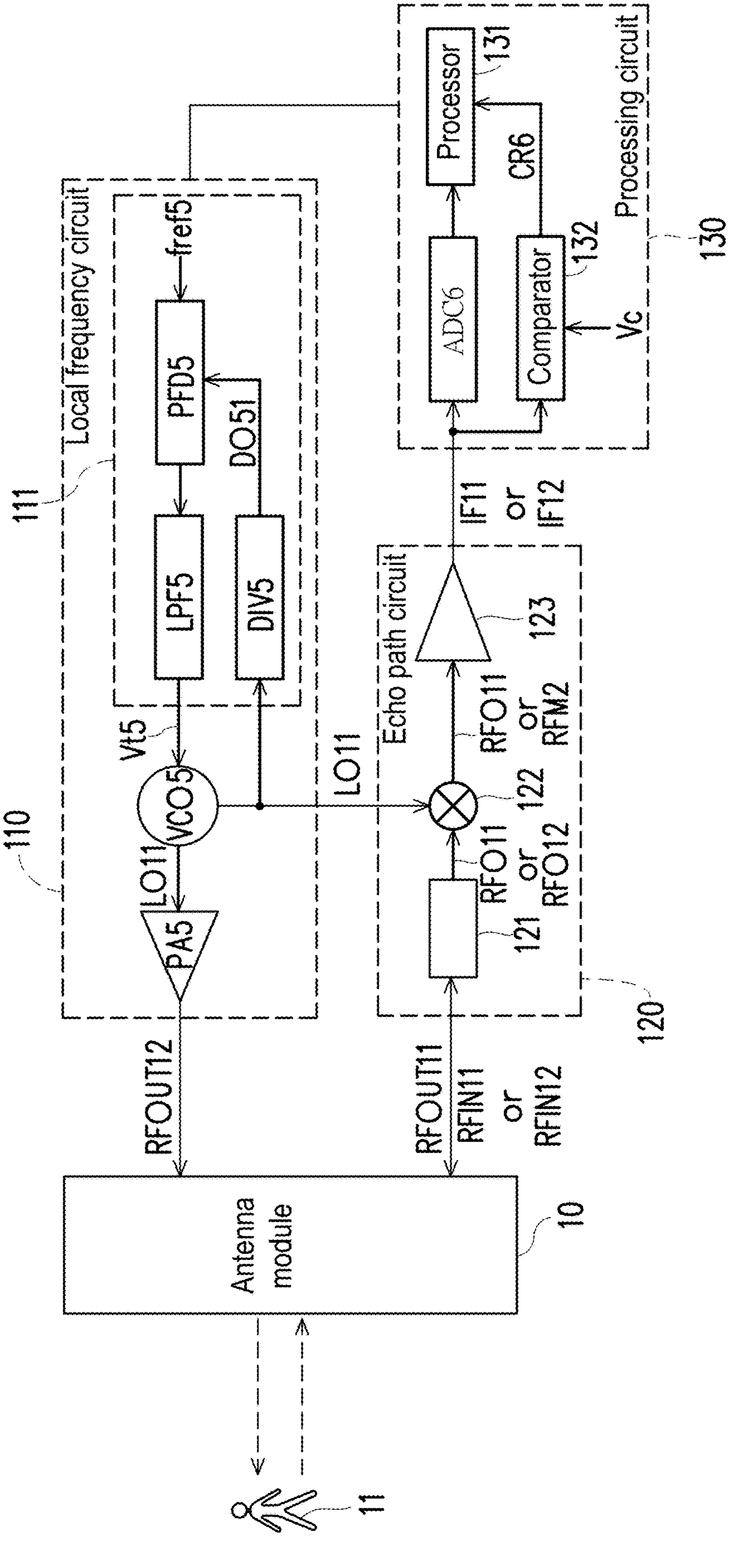
FIG. 6 is a circuit block diagram of a microwave sensor according to an embodiment of the disclosure, which further shows the processing circuit in more detail.

FIG. 6 is a circuit block diagram of a microwave sensor according to an embodiment of the disclosure, which further shows the processing circuit 130 in more detail. The processing circuit 130 shown in FIG. 6 may be configured as one of many embodiments of the processing circuit 130 shown in FIG. 1. For the object 11, the antenna module 10, the local frequency circuit 110, and the echo path circuit 120 shown in FIG. 6, references may be made to the relevant descriptions of FIG. 1, FIG. 2 and/or FIG. 5, so details may not be repeated herein. In the embodiment shown in FIG. 6, the processing circuit 130 may include an analog-to-digital converter ADC6, a processor 131, and a comparator 132.

In the embodiment shown in FIG. 6, the first input terminal of the comparator 132 may be coupled to the echo path circuit 120, the second input terminal may receive a reference voltage signal Vc, and the output terminal may be coupled to the processor 131. The input terminal of the analog-to-digital converter ADC6 may be coupled to the echo path circuit 120, and the output terminal may be coupled to the processor 131.

As described above, in the power saving mode, the comparator 132 may receive the identification signal IF11 from the echo path circuit 120. The comparator 132 may compare the identification signal IF11 with the reference voltage signal Vc, so as to output the comparison result CR6 to the processor 131. The processor 131 may receive the comparison result CR6, and determines whether to enable the local frequency circuit 110 based on the comparison result CR6, thereby determining whether an object has been detected.

As described above, in the normal mode, the analog-to-digital converter ADC6 may receive the identification signal IF12 from the echo path circuit 120. The processor 131 further determines whether an object has been detected based on an output signal from the analog-to-digital converter ADC6.

Figure 7:
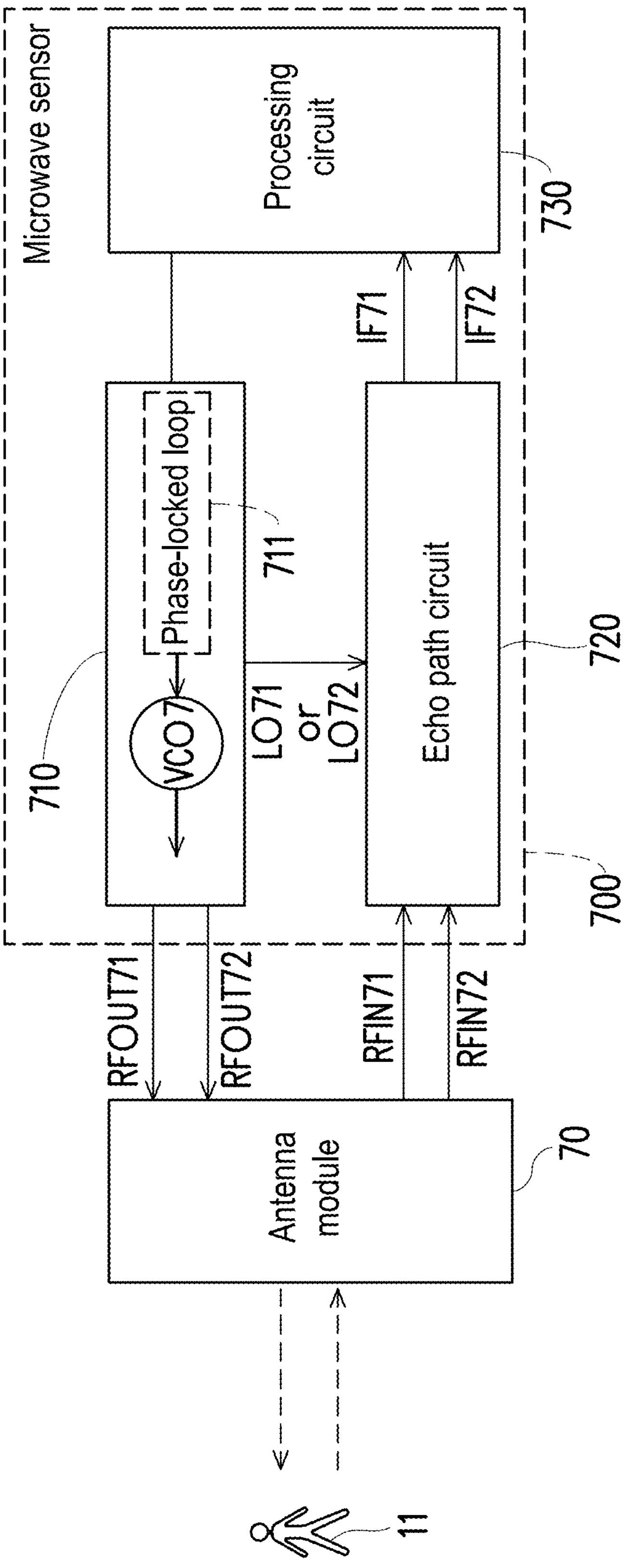
FIG. 7 is a circuit block diagram of a microwave sensor according to another embodiment of the disclosure.

FIG. 7 is a circuit block diagram of a microwave sensor 700 according to another embodiment of the disclosure. For the object 11 and the antenna module 70 shown in FIG. 7, references may be made to the relevant description of FIG. 1, so details may not be repeated herein. In the embodiment shown in FIG. 7, the microwave sensor 700 may include a local frequency circuit 710, an echo path circuit 720, and a processing circuit 730. As for the echo path circuit 720 and the processing circuit 730 shown in FIG. 7, references may be made to the relevant description of FIG. 1, FIG. 2, FIG. 5, and FIG. 6, so details may not be repeated herein. In the embodiment shown in FIG. 7, the local frequency circuit

710 and the echo path circuit 720 may be coupled to the antenna module 70, and the local frequency circuit 710 may include a voltage controlled oscillator VCO7 and a phase-locked loop 711. The phase-locked loop 711 is coupled to the voltage controlled oscillator VCO7. The processing circuit 730 may be coupled to the local frequency circuit 710 and the echo path circuit 720.

In some embodiments, the microwave sensor 700 may operate in a power saving mode. In this case, the phase-locked loop 711 in the local frequency circuit 710 may be disabled, for example, disabled under the control of the processing circuit 730, so as to reduce the power consumption of the microwave sensor 700. The voltage controlled oscillator VCO7 in the local frequency circuit 710 may be enabled, thereby transmitting a radar signal RFOUT71 to the antenna module 70. Furthermore, the voltage controlled oscillator VCO7 may output a local frequency signal LO71 to the echo path circuit 720. The echo path circuit 720 may be enabled, so as to receive an echo signal RFIN71 related to the radar signal RFOUT71 from the antenna module 70. The echo path circuit 720 may output the identification signal IF71 to the processing circuit 730 based on the echo signal RFIN71 and additionally based on the local frequency signal LO71. The processing circuit 730 may determine whether an object 11 has been detected based on the identification signal IF71. If the processing circuit 730 determines that the object 11 has been detected in the power saving mode, the microwave sensor 700 may enter a normal mode from the power saving mode, so to further determine the existence of the object 11. In other embodiments, the local frequency signal LO71 may be omitted, and thus the echo path circuit 720 may output the identification signal IF71 to the processing circuit 730 based on the echo signal RFIN71.

In some embodiments, the microwave sensor 700 may operate in a normal mode. In this case, the phase-locked loop 711 in the local frequency circuit 710 may be enabled, so as to improve the sensitivity or accuracy of the microwave sensor 700. The voltage controlled oscillator VCO7 in the local frequency circuit 710 may be enabled, thereby transmitting a radar signal RFOUT72 to the antenna module 70. Furthermore, the voltage controlled oscillator VCO7 may output the local frequency signal LO72 to the echo path circuit 720. The echo path circuit 720 may be enabled to receive an echo signal RFIN72 related to the radar signal RFOUT72 from the antenna module 70. The echo path circuit 720 may output the identification signal IF72 to the processing circuit 730 based on the echo signal RFIN72 and the local frequency signal LO72. The processing circuit 730 determines whether the object 11 has been detected based on the identification signal IF72. If the processing circuit 730 determines that no object has been detected in the normal mode, the microwave sensor 700 may enter the power saving mode from the normal mode.

Figure 8:
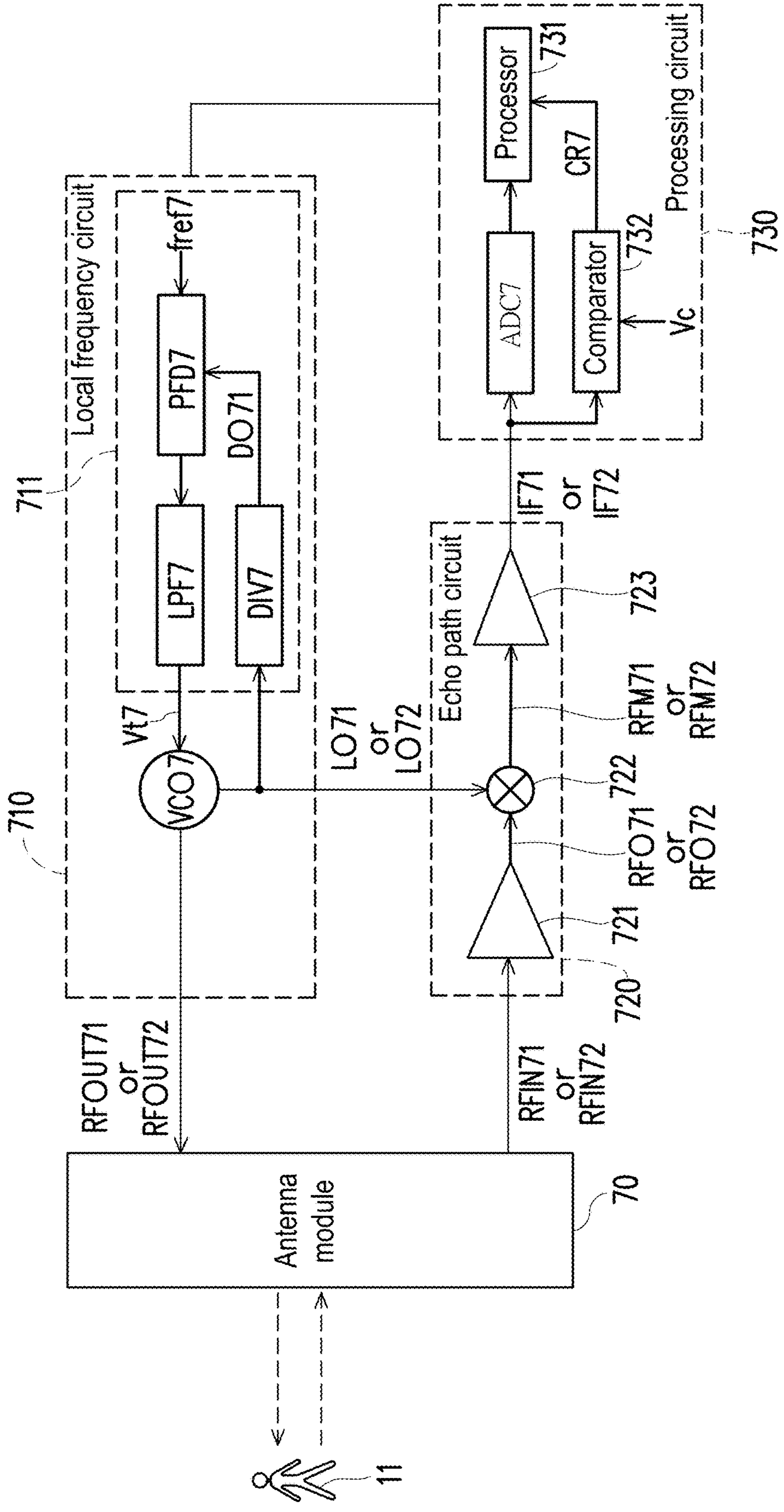
FIG. 8 is a circuit block diagram of a microwave sensor according to another embodiment of the disclosure, which shows the local frequency circuit, the echo path circuit, and the processing circuit in more detail.
Figure 9:
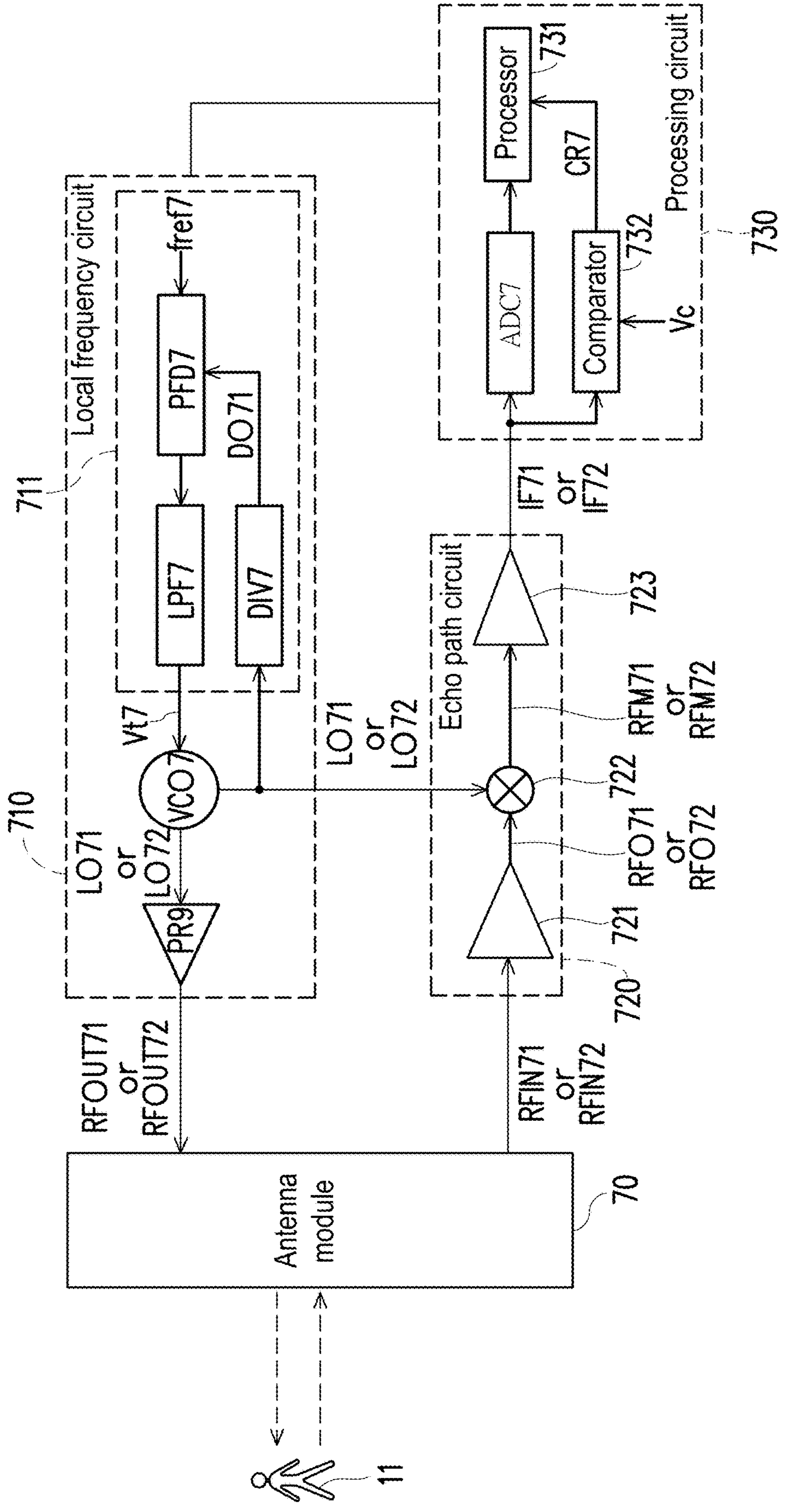
FIG. 9 is a circuit block diagram of a microwave sensor according to yet another embodiment of the disclosure, which shows the local frequency circuit, the echo path circuit, and the processing circuit in more detail.

FIG. 8 is a circuit block diagram of a microwave sensor according to another embodiment of the disclosure. FIG. 9 is a circuit block diagram of a microwave sensor according to yet another embodiment of the disclosure. FIG. 8 and FIG. 9 may further show details of the local frequency circuit 710, the echo path circuit 720, and the processing circuit 730, which may be various embodiments of the corresponding elements shown in FIG. 7. In the embodiments shown in FIGS. 8 and 9, the connection relationships and functions of the elements in the local frequency circuit 710, the echo path circuit 720 and the processing circuit 730 may be similar to those shown in FIG. 7 and FIG. 6, with the differences described as follows.

In the embodiment shown in FIG. 8, the echo path circuit 720 may include a first amplifier 721, a mixer 722, and a second amplifier 723. The input port of the first amplifier 721 may be coupled to the antenna module 70, and the output port may be coupled to the mixer 722. The first input port of the mixer 722 may be coupled to the first amplifier 721, and the second input port may be coupled to the local frequency circuit 710, for example, coupled to the voltage controlled oscillator VCO7 of the local frequency circuit 710. The output port of the mixer 722 may be coupled to the second amplifier 723.

In some embodiments, the second amplifier 723 may be omitted. In some embodiments, the first amplifier 721 may include a low-noise amplifier (LNA) and the second amplifier 723 may include a programmable gain amplifier (PGA).

In the embodiment shown in FIG. 8, for the detailed operations of some of the elements shown, reference may be made to the content shown in FIG. 7 and the aforementioned FIG. 5. Elements with similar or identical functions may be shown with similar or identical reference numerals, and details may not be repeated herein.

As shown in FIG. 8, in the power saving mode, the phase-locked loop 711 in the local frequency circuit 710 may be disabled, and the voltage controlled oscillator VCO7 may be enabled. The voltage controlled oscillator VCO7 may transmit a radar signal RFOUT71 and a local frequency signal LO71. The echo path circuit 720 may be enabled. In the echo path circuit 720, the first amplifier 721 may receive the echo signal RFIN71 and provide the amplified signal RFO71 to the mixer 722 accordingly. The mixer 722 may receive the amplified signal RFO71 from the first amplifier 721 and the local frequency signal LO71 from the voltage controlled oscillator VCO7. The mixer 722 mixes the amplified signal RFO71 and the local frequency signal LO71, so as to output the frequency-mixing signal RFM71 to the second amplifier 723. The second amplifier 723 may provide the identification signal IF71 to the processing circuit 730 based on the frequency-mixing signal RFM71. In other embodiments, the local frequency signal LO71 may be omitted.

As shown in FIG. 8, in the normal mode, the phase-locked loop 711 and the voltage controlled oscillator VCO7 in the local frequency circuit 710 may be enabled. The voltage controlled oscillator VCO7 may transmit a radar signal RFOUT72 and a local frequency signal LO72. The echo path circuit 720 may be enabled. In the echo path circuit 720, the first amplifier 721 may receive the echo signal RFIN72 and provide the amplified signal RFO72 to the mixer 722 accordingly. The mixer 722 may receive the amplified signal RFO72 from the first amplifier 721 and the local frequency signal LO72 from the voltage controlled oscillator VCO7. The mixer 722 mixes the amplified signal RFO72 and the local frequency signal LO72, so as to output the frequency-mixing signal RFM72 to the second amplifier 723. The second amplifier 723 may provide the identification signal IF72 to the processing circuit 730 based on the frequency-mixing signal RFM72.

In the embodiment shown in FIG. 9, for the object 11, the antenna module 70, the local frequency circuit 710, the echo path circuit 720, and the processing circuit 730, references may be made to the relevant description of FIG. 8, so details may not be repeated herein. Different from the embodiment shown in FIG. 8, the local frequency circuit 710 shown in FIG. 9 may further include a power amplifier PA9. The input terminal of the power amplifier PA9 is coupled to the voltage controlled oscillator VCO7 to receive the local frequency signal LO71 or LO72. The power amplifier PA9 may amplify the local frequency signal LO71 or LO72, so as to output the radar signal RFOUT71 or RFOUT72 to the antenna module 70.

As shown in FIG. 9, in the power saving mode, the phase-locked loop 711 and/or the power amplifier PA9 in the local frequency circuit 710 may be disabled, while the voltage controlled oscillator VCO7 may be enabled.

As shown in FIG. 9, in the normal mode, the phase-locked loop 711 and the power amplifier PA9 in the local frequency circuit 710 may be enabled, and the voltage controlled oscillator VCO7 may be enabled. The voltage controlled oscillator VCO7 may output the local frequency signal LO72 to the power amplifier PA9 and the mixer 722. The power amplifier PA9 may amplify the local frequency signal LO72, so as to transmit the radar signal RFOUT72 to the antenna module 70.

In one or more embodiments, the microwave sensor 100 or 700 may detect whether there is an object 11 in a detection field. When it is determined that the object 11 has been detected in a power saving mode, the microwave sensor 100 or 700 may enter a normal mode from the power saving mode for a further determination. In the normal mode, a local frequency circuit may be enabled, so as to improve the sensitivity or accuracy of the microwave sensor 100 or 700. When it is determined that no object has been detected in the normal mode, the microwave sensor 100 or 700 may enter the power saving mode from the normal mode, and in the power saving mode, the local frequency circuit may be disabled or partially disabled. For example, the phase-locked loop 711 of the local frequency circuit 710 may be disabled, thereby reducing the power consumption of the microwave sensor 100 or 700.

Although the disclosure has been described in detail with reference to the above embodiments, they may not be intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A microwave sensor, comprising:

a local frequency circuit;

an echo path circuit, coupled to an antenna module; and a processing circuit, coupled to the local frequency circuit and the echo path circuit, wherein, when the microwave sensor operates in a power saving mode, the processing circuit disables the local frequency circuit, wherein the echo path circuit transmits a first radar signal, the echo path circuit receives a first echo signal related to the first radar signal from the antenna module, the echo path circuit outputs a first identification signal to the processing circuit based on the first echo signal, and the processing circuit determines whether an object has been detected based on the first identification signal;

in response to the processing circuit determining that the object has been detected, the microwave sensor enters a normal mode from the power saving mode;

when the microwave sensor operates in the normal mode, the processing circuit enables the local frequency circuit wherein the local frequency circuit transmits a second radar signal, the local frequency circuit outputs a local frequency signal to the echo path circuit, the echo path circuit receives a second echo signal related to the second radar signal from the antenna module, the echo path circuit outputs a second identification signal to the processing circuit based on the second echo signal and the local frequency signal, and the processing circuit determines whether the object has been detected based on the second identification signal; and in response to the processing circuit determining that no object has been detected, the microwave sensor enters the power saving mode from the normal mode.

2. The microwave sensor according to claim 1, wherein the echo path circuit comprises:

an oscillation amplifying circuit, comprising a first port and a second port, wherein the first port of the oscillation amplifying circuit is coupled to the antenna module for transmitting the first radar signal, receiving the first echo signal, or receiving the second echo signal; and a frequency-mixing switching circuit, comprising a first input port, a second input port, and an output port, wherein the first input port is coupled to the second port of the oscillation amplifying circuit, and the second input port is coupled to the local frequency circuit.

3. The microwave sensor according to claim 2, wherein the oscillation amplifying circuit comprises:

an oscillation circuit;

a switching circuit; and an amplifying circuit, wherein the switching circuit is coupled between the oscillation circuit and the amplifying circuit, in the power saving mode, the oscillator circuit is enabled to transmit the first radar signal, and the amplifying circuit is enabled to amplify the first echo signal; and in the normal mode, the amplifying circuit is enabled to amplify the second echo signal.

4. The microwave sensor according to claim 3, wherein, the oscillation circuit comprises a first terminal and a second terminal, both the first terminal and the second terminal are coupled to the second port of the oscillation amplifying circuit;

the switching circuit comprises a first terminal, a second terminal, a third terminal, and a fourth terminal, wherein the first terminal and the second terminal of the switching circuit are respectively coupled to the first terminal and the second terminal of the oscillation circuit;

the amplifying circuit comprises a first terminal, a second terminal, and a third terminal, wherein the first terminal and the second terminal of the amplifying circuit are respectively coupled to the third terminal and the fourth terminal of the switching circuit, and the third terminal of the amplifying circuit is coupled to the first port of the oscillation amplifying circuit.

5. The microwave sensor according to claim 4, wherein the oscillation circuit comprises:

an inductor, comprising a first terminal and a second terminal, respectively coupled to a first node and a second node;

a first capacitor, comprising a first terminal and a second terminal, respectively coupled to the first node and the second node;

a first transistor, comprising a first terminal, a second terminal, and a control terminal, wherein the first terminal of the first transistor is coupled to the first node, the second terminal of the first transistor is coupled to the first terminal of the oscillation circuit, and the control terminal of the first transistor is coupled to the second node;

a second transistor, comprising a first terminal, a second terminal, and a control terminal, wherein the first terminal of the second transistor is coupled to the second node, the second terminal of the second transistor is coupled to the second terminal of the oscillation circuit, and the control terminal of the second transistor is coupled to the first node;

a first current source, comprising a current output terminal coupled to the second terminal of the first transistor to provide a first current; and a second current source, comprising a current output terminal coupled to the second terminal of the second transistor to provide a second current.

6. The microwave sensor according to claim 5, wherein the oscillation circuit further comprises:

a frequency band adjustment circuit, comprising a first terminal and a second terminal, wherein the first terminal of the frequency band adjustment circuit is coupled to the first node, the second terminal of the frequency band adjustment circuit is coupled to the second node, and the frequency band adjustment circuit comprises:

a second capacitor, comprising a first terminal and a second terminal, wherein the first terminal of the second capacitor is coupled to the first node;

a third capacitor, comprising a first terminal and a second terminal, wherein the second terminal of the third capacitor is coupled to the second node; and a switching element, comprising a first terminal and a second terminal, respectively coupled to the second terminal of the second capacitor and the first terminal of the third capacitor.

7. The microwave sensor according to claim 4, wherein the switching circuit comprises:

a third transistor, comprising a first terminal, a second terminal and a control terminal, wherein the first terminal of the third transistor is coupled to the first terminal of the switching circuit, the second terminal of the third transistor is coupled to the fourth terminal of the switching circuit, and the control terminal of the third transistor is coupled to the first node;

a fourth transistor, comprising a first terminal, a second terminal, and a control terminal, wherein the first terminal of the fourth transistor is coupled to the first terminal of the switching circuit, the second terminal of the fourth transistor is coupled to the third terminal of the switching circuit, and the control terminal of the fourth transistor is coupled to the second node;

a fifth transistor, comprising a first terminal, a second terminal, and a control terminal, wherein the first terminal of the fifth transistor is coupled to the second terminal of the switching circuit, the second terminal of the fifth transistor is coupled to the fourth terminal of the switching circuit, and the control terminal of the fifth transistor is coupled to the second node; and a sixth transistor, comprising a first terminal, a second terminal and a control terminal, wherein the first terminal of the sixth transistor is coupled to the second terminal of the switching circuit, the second terminal of the sixth transistor is coupled to the third terminal of the switching circuit, and the control terminal of the sixth transistor is coupled to the first node, the oscillation circuit provides a first local oscillation signal at the first node, the oscillation circuit provides a second local oscillation signal at the second node, the control terminal of the third transistor and the control terminal of the sixth transistor receive the first local oscillation signal, and the control terminal of the fourth transistor and the control terminal of the fifth transistor receive the second local oscillation signal.

8. The microwave sensor according to claim 4, wherein the amplifying circuit comprises:

a seventh transistor, comprising a first terminal, a second terminal, and a control terminal, wherein the first terminal of the seventh transistor is coupled to the first terminal of the amplifying circuit, the second terminal of the seventh transistor is coupled to a third node, and the control terminal of the seventh transistor is coupled to the second terminal of the amplifying circuit;

an eighth transistor, comprising a first terminal, a second terminal, and a control terminal, wherein the second terminal of the eighth transistor is coupled to a first reference voltage terminal, and the control terminal of the eighth transistor is coupled to the third node; and a ninth transistor, comprising a first terminal, a second terminal, and a control terminal, wherein the first terminal of the ninth transistor is coupled to the second terminal of the amplifying circuit, the second terminal of the ninth transistor is coupled to the first terminal of the eighth transistor, and the control terminal of the ninth transistor is coupled to a bias voltage terminal.

9. The microwave sensor according to claim 8, wherein the amplifying circuit further comprises:

a third current source, comprising a current output terminal coupled to the first terminal of the seventh transistor to provide a third current; and a fourth current source, comprising a current output terminal coupled to the first terminal of the ninth transistor to provide a fourth current.

10. The microwave sensor according to claim 8, wherein the amplifying circuit further comprises:

a second resistor, coupled between the bias voltage terminal and the control terminal of the ninth transistor;

a fourth capacitor, coupled between the control terminal of the ninth transistor and the third node; and a fifth capacitor, coupled between the third terminal of the amplifying circuit and the third node.

11. The microwave sensor according to claim 5, wherein, in the power saving mode, the first current is equal to the second current and both the first current and the second current are zero; and in the normal mode, the first current is equal to the second current and both the first current and the second current are greater than zero.

12. The microwave sensor according to claim 9, wherein, in the power saving mode, the third current is greater than the fourth current and both the third current and the fourth current are greater than zero; and in the normal mode, the third current is less than or equal to the fourth current, and both the third current and the fourth current are greater than zero.

13. The microwave sensor according to claim 3, wherein, in the power saving mode, the amplifying circuit amplifies the first echo signal and outputs a first amplified signal to the frequency-mixing switching circuit, the frequency-mixing switching circuit outputs the first amplified signal to an amplifier, and the amplifier receives the first amplified signal and outputs the first identification signal to the processing circuit.

14. The microwave sensor according to claim 3, wherein, in the normal mode, the amplifying circuit amplifies the second echo signal and outputs a second amplified signal to the frequency-mixing switching circuit, the frequency-mixing switching circuit mixes the second amplified signal and the local frequency signal to output a frequency-mixing signal to an amplifier, and the amplifier receives the frequency-mixing signal and outputs the second identification signal to the processing circuit.

15. The microwave sensor according to claim 2, wherein the frequency-mixing switching circuit comprises:

a tenth transistor, comprising a first terminal, a second terminal, and a control terminal, wherein the first terminal of the tenth transistor is coupled to a fourth node, and the second terminal of the tenth transistor is coupled to a fifth node;

an eleventh transistor, comprising a first terminal, a second terminal, and a control terminal, wherein the first terminal of the eleventh transistor is coupled to a sixth node, and the second terminal of the eleventh transistor is coupled to the fifth node;

a twelfth transistor, comprising a first terminal, a second terminal, and a control terminal, wherein the first terminal of the twelfth transistor is coupled to the fourth node, and the second terminal of the twelfth transistor is coupled to a seventh node; and a thirteenth transistor, comprising a first terminal, a second terminal, and a control terminal, wherein the first terminal of the thirteenth transistor is coupled to the sixth node, the second terminal of the thirteenth transistor is coupled to the seventh node, the control terminal of the tenth transistor and the control terminal of the thirteenth transistor receive a first phase control signal, and the control terminal of the eleventh transistor and the control terminal of the twelfth transistor receive a second phase control signal.

16. The microwave sensor according to claim 15, wherein the local frequency signal comprises a first frequency-phase signal and a second frequency-phase signal, and the frequency-mixing switching circuit further comprises:

a first selector, comprising a first selection terminal, a second selection terminal, and an output terminal, wherein the first selection terminal of the first selector is configured to receive a first fixed voltage signal, the second selection terminal of the first selector is configured to receive the first frequency-phase signal, and the output terminal of the first selector provides the first phase control signal; and a second selector, comprising a first selection terminal, a second selection terminal, and an output terminal, wherein the first selection terminal of the second selector is configured to receive a second fixed voltage signal, the second selection terminal of the second selector is configured to receive the second frequency-phase signal, and the output terminal of the second selector provides the second phase control signal.

17. The microwave sensor according to claim 2, wherein the local frequency circuit comprises:

a phase-locked loop;

a voltage controlled oscillator, coupled to the phase-locked loop and coupled to the frequency-mixing switching circuit of the echo path circuit; and a power amplifier, comprising an input terminal and an output terminal, wherein the input terminal of the power amplifier is coupled to the voltage controlled oscillator, and in the normal mode, the voltage controlled oscillator provides the local frequency signal to the power amplifier and the frequency-mixing switching circuit, and the power amplifier amplifies the local frequency signal and outputs the second radar signal.

18. The microwave sensor according to claim 1, wherein the processing circuit comprises:

a comparator, comprising a first input terminal, a second input terminal, and an output terminal, wherein the first input terminal of the comparator receives the first identification signal from the echo path circuit, the second input terminal of the comparator receives a reference voltage signal, and the comparator compares the first identification signal and the reference voltage signal to output a comparison result;

a processor, coupled to the output terminal of the comparator to receive the comparison result, wherein the processor determines whether to enable the local frequency circuit based on the comparison result; and an analog-to-digital converter, comprising an input terminal and an output terminal, wherein the input terminal of the analog-to-digital converter receives the second identification signal from the echo path circuit, and the output terminal of the analog-to-digital converter is coupled to the processor.

19. A microwave sensor, comprising:

a local frequency circuit, comprising a voltage controlled oscillator and a phase-locked loop coupled to the voltage controlled oscillator;

an echo path circuit, coupled to an antenna module; and a processing circuit, coupled to the local frequency circuit and the echo path circuit, wherein, when the microwave sensor operates in a power saving mode, the processing circuit disables the phase-locked loop, the local frequency circuit transmits a first radar signal to the antenna module, the echo path circuit receives a first echo signal related to the first radar signal from the antenna module and output a first identification signal to the processing circuit based on the first echo signal, and the processing circuit determines whether an object has been detected based on the first identification signal;

in response to the processing circuit determining that the object has been detected, the microwave sensor enters a normal mode from the power saving mode;

when the microwave sensor operates in the normal mode, the processing circuit enables the phase-locked loop, the local frequency circuit transmits a second radar signal and output a local frequency signal to the echo path circuit, the echo path circuit receives a second echo signal related to the second radar signal from the antenna module and outputs a second identification signal to the processing circuit based on the second echo signal and based on the local frequency signal, and the processing circuit determines whether the object has been detected based on the second identification signal; and in response to the processing circuit determining that no object has been detected, the microwave sensor enters the power saving mode from the normal mode.

20. The microwave sensor according to claim 19, wherein the echo path circuit comprises:

a first amplifier, comprising an input port and an output port, wherein the input port of the first amplifier is coupled to the antenna module to receive the first echo signal or receive the second echo signal; and a mixer, comprising a first input port, a second input port, and an output port, wherein the first input port of the mixer is coupled to the output port of the first amplifier, and the second input port of the mixer is coupled to the voltage controlled oscillator of the local frequency circuit to receive the local frequency signal;

the local frequency circuit further comprises:

a power amplifier, having an input terminal and an output terminal, wherein the input terminal of the power amplifier is coupled to the voltage controlled oscillator, and the output terminal of the power amplifier is coupled to the antenna module, in response to the microwave sensor operating in the power saving mode, the processing circuit disables the phase-locked loop; and in response to the microwave sensor operating in the normal mode, the processing circuit enables the phase-locked loop, the voltage controlled oscillator provides the local frequency signal to the power amplifier, the processing circuit enables the power amplifier to transmit the second radar signal to the antenna module.

* * * * *